Nov. 13, 1962 S. S. TULGAN ET AL 3,064,215
UHF TUNED LOAD CIRCUIT
Filed July 1, 1958
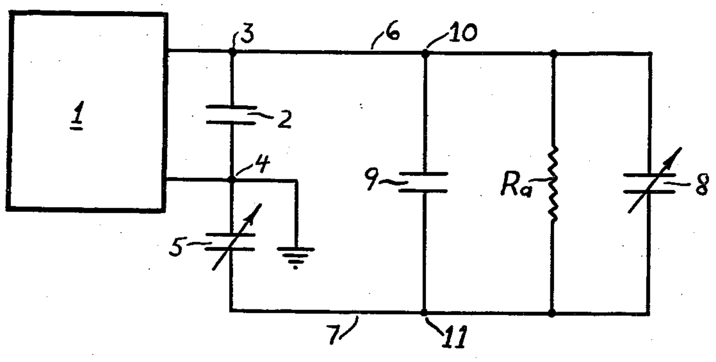
INVENTORS
Stanley S. Tulgan
Jonas M. Shapiro
BY Daniel Jay Tick
Alfred E. Miller
Attorneys United States Patent Office 3,064,215
Patented Nov. 13, 1962

3,064,215

UHF TUNED LOAD CIRCUIT

Stanley S. Tulgan, Jackson Heights, N.Y., and Jonas M. Shapiro, Stamford, Conn., assignors to Manson Laboratories, Incorporated, a corporation of Connecticut Filed July 1, 1958, Ser. No. 745,947
3 Claims. (Cl. 334—45)

The present invention relates to a tuned load circuit. More particularly, the invention relates to an ultra-high frequency transmission line which is capacitively tuned and functions as a load for a circuit arrangement which preferably comprises an electron discharge device.

In accordance with the present invention, the tuned load circuit comprises a pair of conductors, a variable balancing capacitor connected in series circuit arrangement with the output capacity of an electron discharge device, the electron discharge device being connected between the conductors at one end thereof, a variable tuning capacitor connected between the conductors at the other end of the conductors, and a padder or null capacitor connected between the conductors at a point interposed between the ends thereof.

The principal object of the present invention is the provision of a tuned load circuit for a circuit arrangement.

An object of the present invention is the provision of a tuned load circuit which may tune frequency linearly with rotation of the tuning means.

Another object of the present invention is the provision of a tuned load circuit which may be loaded over the frequency range without moving the coupling loop.

Another object of the present invention is the provision of a tuned load circuit which is relatively simple in structure but electrically efficient.

Another object of the present invention is the provision of a tuned load circuit which is devoid of sliding or wiping contacts.

Another object of the present invention is the provision of a tuned load circuit having reduced voltage breakdown problems.

Still another object of the present invention is the provision of a tuned load circuit comprising a capacitively tuned ultra-high frequency transmission line.

These and other objects and features of the invention will be apparent from a consideration of the following detailed description taken in connection with the accompanying drawing, wherein the single FIGURE is a schematic diagram of an embodiment of the tuned load circuit of the present invention.

In the FIGURE, a circuit arrangement 1 has an output capacity 2 appearing across a pair of terminals 3 and 4. The circuit arrangement 1 preferably comprises an electron discharge device having a cathode connected to the terminal 4 and an anode connected to the terminal 3. A variable balancing capacitor 5 is connected to the terminal 4 so that the capacitor 5 is connected in series circuit arrangement with the terminals 3 and 4 and thus with the output capacity 2. The series circuit arrangement of the output capacity 2 and the capacitor 5 is connected between a pair of conductors 6 and 7 at the end of the conductors closest to the circuit arrangement 1. The conductors 6 and 7 are designed to conduct ultra-high frequency currents and may comprise, for example, copper bars. The conductors 6 and 7 thus form an ultra-high frequency transmission line.

A variable tuning capacitor 8 is connected between the conductors 6 and 7 at the end of the conductors farthest from the circuit arrangement 1. A padder or null capacitor 9 is connected between the conductors 6 and 7 at points 10, 11 interposed between the ends of said conductors.

When the transmission line is loaded by the capacities 2 and 5, the electrical length of the line equals half a wavelength of the frequency to which the line is tuned, including the capacitors 8 and 9. The capacitances thus determine the electrical length of the line. The mechanical length of the line is determined by the limitations imposed by feasible working conditions.

The variable balancing capacitor 5 is used to simulate the electron discharge tube in the circuit arrangement 1. The circuit arrangement 1, may comprise, for example, a push-pull circuit having two electron discharge tubes each having its anode connected to a terminal of the transmission line. This reduces the loading capacity 2 of the circuit arrangement 1 by a factor of two and permits the use of a pair of conductors 6, 7 of manageable length. In the example shown in the FIGURE, however, the circuit arrangement 1 has a single ended output 3.

The fixed null capacitor 9 enables the variable tuning capacitor 8 to tune a desired frequency range, such as, for example, 225 to 400 megacycles per second, without requiring a very large capacity variation of said tuning capacitor. The points 10, 11 are selected at a voltage null when the transmission line is tuned to the higher frequency limit of 400 megacycles per second. The null capacitor 9 is connected between the null points 10, 11 so that it does not affect the transmission line at the higher frequency limit.

It may be shown from transmission line theory that a virtual short circuit appears across the points 10 and 11. Any additional units connected across these points has no effect on the tuned load circuit. However, as the capacity of the variable tuning capacitor 8 increases, the voltage null moves towards said tuning capacitor and the null capacitor 9 then loads the transmission line. The null capacitor 9 effectively lengthens the line and enables the tuning capacitor 8 to tune with considerably less capacity than it would require if the null capacitor were not utilized. The tuning capacitor 8 may thus be built with practical plate shapes to enable the tuned load circuit to tune linearly with rotation of said tuning capacitor.

If the null capacitor 9 were omitted from the transmission line, the tuned load circuit could not tune down to the lower frequency limit of 225 megacycles per second.

The optimum loop coupling of the transmission line occurs near the voltage null points 10, 11. If the null were to move a considerable distance along the transmission line from the lower to the higher frequency limit of the tuning range, it would be necessary to shift the coupling loop of the antenna. The coupling loop may be made stationary by restricting the travel of the null points. This may be achieved by adjusting the capacity values of the null capacitor 9 and the tuning capacitor 8 to a level at which the voltage null moves a short distance, consistent with good efficiency. If the null capacitor 9 has too large a capacity value, the circuit quality and therefore the efficiency of the transmission line is adversely affected. The capacity values of the capacitors 8 and 9 are therefore determined as a necessary compromise between good efficiency and practical tuning capacity. Due to the stationary coupling, the mechanical problems involved in tracking a coupling loop as the tuning capacitor 8 is tuned through its tuning range, are eliminated.

As the frequency moves toward its lower limit of 225 megacycles per second, the voltage across the tuning capacitor 8 decreases in magnitude thereby reducing voltage breakdown problems such as those of the corona discharge type.

In a preferred embodiment of the tuned load circuit of the present invention, the tuning range of the circuit was from 225 to 400 megacycles per second; the output capacity of the electron discharge device which comprised the circuit arrangement 1 being 6 micromicrofarads. The antenna impedance to be loaded into the tuned load circuit was 50 ohms which was transformed by the coupling loop of the antenna to an optimum resistance shown in the figure as R*a*. The balancing capacitor 5 had a capacity value of 4 micromicrofarads; the tuning capacitor 8 had a capacity value of from 8 to 40 micromicrofarads and the null capacitor 9 had a capacity value of 5 micromicrofarads. A null capacitor having a capacity value of less than 5 micromicrofarads could have been used but would have been impractical because it would have increased the capacity requirement of the tuning capacitor 8.

While the invention has been described by means of a specific example and in a specific embodiment, we do not wish to be limited thereto, for obvious modifications will occur to those skilled in the art without departing from the spirit and scope of the invention.

What we claim is:

1. A tuned load circuit for a circuit arrangement having an output capacity, comprising a pair of spaced conductors, a variable balancing capacitor connected in series circuit arrangement with said output capacity, said series arrangement being connected between said conductors at one end of the said conductors, a variable tuning capacitor connected between said conductors at the other end of the said conductors, a null capacitor connected between said conductors at points interposed between the ends of the said conductors, said null capacitor having a capacitance value calculated to enable said variable tuning capacitor to tune a desired frequency range with a minimum capacity variation of the said variable tuning capacitor and to enable the said null capacitor to tune down to the lower frequency limit of said desired frequency range, said points being substantially located at a voltage null determined at the maximum value of said desired tuning frequency range, said variable tuning capacitor and said null capacitor having capacitance values calculated to restrict the movement of said voltage null in a manner whereby the said voltage null is substantially fixed, and coupling loop means for deriving a power output from said tuned load circuit, said coupling loop means being substantially fixedly positioned in operative proximity to said voltage null points.

2. A tuned load circuit for a circuit arrangement having an output capacity, comprising an ultra-high frequency transmission line having a pair of spaced conductors, a variable balancing capacitor connected in series circuit arrangement with said output capacity, said series circuit arrangement being connected between said conductor at one end of the said conductors, a variable tuning capacitor connected between said conductors at the other end of the said conductors, a null capacitor connected between said conductors at points interposed between the ends of the said conductors, said null capacitor having a capacitance value calculated to enable said variable tuning capacitor to tune a desired frequency range with a minimum capacity variation of the said variable tuning capacitor and to enable the said null capacitor to tune down to the lower frequency limit of said desired frequency range, said points being substantially located at a voltage null determined at the maximum value of said desired tuning frequency range, said variable tuning capacitor and said null capacitor having capacitance values calculated to restrict the movement of said voltage null in a manner whereby the said voltage null is substantially fixed, and coupling loop means for deriving a power output from said tuned load circuit, said coupling loop means being substantially fixedly positioned in operative proximity to said voltage null points.

3. A tuned load circuit for a circuit arrangement having an output capacity, comprising an ultra-high frequency transmission line having a pair of spaced conductors, said conductors being substantially parallel to each other, a variable balancing capacitor connected in series circuit arrangement with said output capacity, said series circuit arrangement being connected between said conductors at one end of the said conductors, a variable tuning capacitor for tuning said line to a desired frequency within a desired frequency range connected between said conductors at the other end of the said conductors, said conductors having an electrical length substantially equal to half a wavelength of the frequency to which said line is tuned, a null capacitor connected between said conductors at points interposed between the ends of the said conductors, said null capacitor having a capacitance value calculated to enable said variable tuning capacitor to tune a desired frequency range with a minimum capacity variation of the said variable tuning capacitor and to enable the said null capacitor to tune down to the lower frequency limit of said desired frequency range, said points being substantially located at a voltage null determined at the maximum value of said desired tuning frequency range, said variable tuning capacitor and said null capacitor having capacitance values calculated to restrict the movement of said voltage null in a manner whereby the said voltage null is substantially fixed, and coupling loop means for deriving a power output from said tuned load circuit, said coupling loop means being substantially fixedly positioned in operative proximity to said voltage null points.

References Cited in the file of this patent

UNITED STATES PATENTS

| | | |
|---|---|---|
| 2,196,673 | Gutzmann | Apr. 9, 1940 |
| 2,414,991 | Wheeler | Jan. 28, 1947 |
| 2,740,889 | Eckert | Apr. 3, 1956 |
| 2,788,446 | Cerveny et al. | Apr. 9, 1957 |